United States Patent
Khokhar et al.

(10) Patent No.: US 12,063,152 B2
(45) Date of Patent: Aug. 13, 2024

(54) ZERO TOUCH MANAGEMENT FROM CLOUD

(71) Applicant: Dell Products L.P., Round Rock, TX (US)

(72) Inventors: Muzhar S. Khokhar, Shrewsbury, MA (US); XiaoJun Wu, Shanghai (CN); Haijun Zhong, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/152,036

(22) Filed: Jan. 9, 2023

(65) Prior Publication Data

US 2024/0235975 A1 Jul. 11, 2024

(51) Int. Cl.
*H04L 43/10* (2022.01)
*H04L 67/02* (2022.01)
*H04L 67/141* (2022.01)

(52) U.S. Cl.
CPC .............. *H04L 43/10* (2013.01); *H04L 67/02* (2013.01); *H04L 67/141* (2013.01)

(58) Field of Classification Search
CPC ........ H04L 43/10; H04L 67/02; H04L 67/141
See application file for complete search history.

(56) References Cited

U.S. PATENT DOCUMENTS

| | | | |
|---|---|---|---|
| 2020/0403821 A1* | 12/2020 | Dev | H04L 49/20 |
| 2021/0211351 A1* | 7/2021 | Lin | H04L 41/0803 |
| 2021/0314385 A1* | 10/2021 | Pande | H04L 41/042 |
| 2022/0386124 A1* | 12/2022 | Kb | H04W 12/069 |

* cited by examiner

*Primary Examiner* — Cheikh T Ndiaye
(74) *Attorney, Agent, or Firm* — Jackson Walker L.L.P.

(57) ABSTRACT

An information handling system may include at least one processor and a memory. The information handling system may be configured to receive a heartbeat message from a second information handling system via a network, wherein the second information handling is system not publicly accessible via the network, and wherein the heartbeat message is operable to establish a communication channel between the information handling system and the second information handling system; and transmit a response to the second information handling system via the communication channel, wherein the response indicates whether any management tasks should be executed by the second information handling system.

18 Claims, 2 Drawing Sheets

ZERO TOUCH MANAGEMENT FROM CLOUD

TECHNICAL FIELD

The present disclosure relates in general to information handling systems, and more particularly to techniques for management of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines and networking into a single system in an effort to reduce data center complexity and increase scalability. Hyper-converged platforms may include a hypervisor for virtualized computing, software-defined storage, and virtualized networking, and they typically run on standard, off-the-shelf servers. One type of HCI solution is the Dell EMC VxRail™ system. Some examples of HCI systems may operate in various environments (e.g., an HCI management system such as the VMware® vSphere® ESXi™ environment, or any other HCI management system). Some examples of HCI systems may operate as software-defined storage (SDS) cluster systems (e.g., an SDS cluster system such as the VMware® vSAN™ system, or any other SDS cluster system).

In the HCI context (as well other contexts), information handling systems may execute virtual machines (VMs) for various purposes. A VM may generally comprise any program of executable instructions, or aggregation of programs of executable instructions, configured to execute a guest operating system on a hypervisor or host operating system in order to act through or in connection with the hypervisor/host operating system to manage and/or control the allocation and usage of hardware resources such as memory, central processing unit time, disk space, and input and output devices, and provide an interface between such hardware resources and application programs hosted by the guest operating system.

In an edge computing scenario, an edge gateway information handling system may be used to enable communications between other edge devices and a cloud system (e.g., an information handling system accessible via the internet). Because of the physical location of an edge deployment, it is advantageous to be able to perform management tasks for edge devices (e.g., provisioning, monitoring, upgrading of software and firmware, etc.) on-demand and without the necessity of an administrator being physically present at the edge location. Such remote management is referred to herein as "zero touch" management.

Performing zero touch management on edge devices can be difficult, however, because an edge gateway device and the other edge devices may not be publicly accessible. For example, the edge gateway may not have a publicly routed internet protocol (IP) address, or it may be behind a firewall or proxy system, etc. Accordingly, the edge gateway and the other edge devices may not be reachable from a cloud-based management system when an administrator needs to perform management tasks.

Embodiments of this disclosure allow for zero touch management of edge systems and other information handling systems that are not publicly accessible.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with management of information handling systems may be reduced or eliminated.

In accordance with embodiments of the present disclosure, an information handling system may include at least one processor and a memory. The information handling system may be configured to receive a heartbeat message from a second information handling system via a network, wherein the second information handling system is not publicly accessible via the network, and wherein the heartbeat message is operable to establish a communication channel between the information handling system and the second information handling system; and transmit a response to the second information handling system via the communication channel, wherein the response indicates whether any management tasks should be executed by the second information handling system.

In accordance with these and other embodiments of the present disclosure, a method may include an information handling system receiving a heartbeat message from a second information handling system via a network, wherein the second information handling system is not publicly accessible via the network, and wherein the heartbeat message establishes a communication channel between the information handling system and the second information handling system; and the information handling system transmitting a response to the second information handling system via the communication channel, wherein the response indicates whether any management tasks should be executed by the second information handling system.

In accordance with these and other embodiments of the present disclosure, an article of manufacture may include a non-transitory, computer-readable medium having computer-executable instructions thereon that are executable by a processor of an information handling system for: receiving a heartbeat message from a second information handling system via a network, wherein the second information handling system is not publicly accessible via the network, and wherein the heartbeat message establishes a communication channel between the information handling system and the second information handling system; and transmitting a response to the second information handling system via the communication channel, wherein the response indicates whether any management tasks should be executed by the second information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
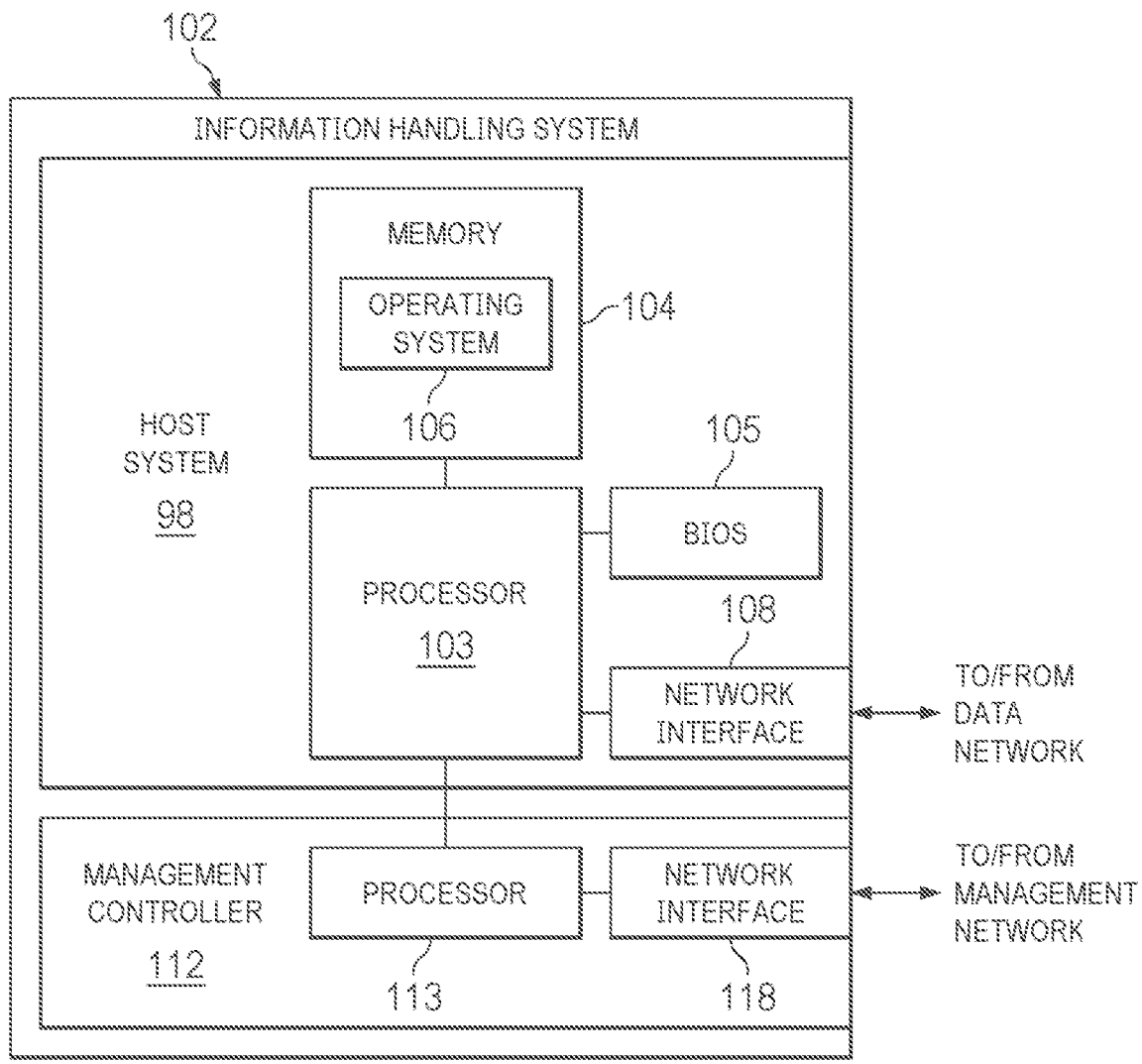
FIG. 1 illustrates a block diagram of an example information handling system, in accordance with embodiments of the present disclosure.
Figure 2:
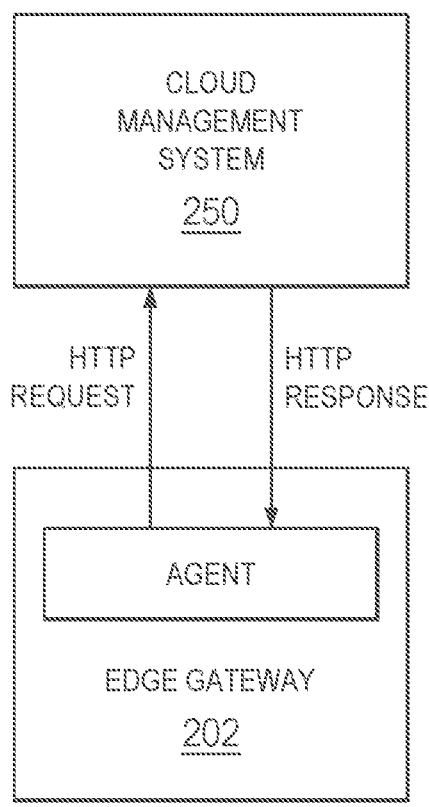
FIG. 2 illustrates a block diagram of zero touch management of an information handling system, in accordance with embodiments of the present disclosure.

Preferred embodiments and their advantages are best understood by reference to FIGS. 1 and 2, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in shape, performance, size, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, embodiments of this disclosure provide improvements in management of information handling systems 102 that may not be publicly accessible via the internet (e.g., edge systems). As discussed in more detail below, some embodiments may accomplish this via a "pull mode" in which an edge gateway contacts the cloud system to begin a management task, instead of a "push mode" in which the cloud system needs to initiate communications. In this way, communications may be established between the cloud and the edge gateway (as well as any edge systems behind the edge gateway), in spite of the edge systems not being publicly reachable. It should be noted that while the scenario of an edge deployment is discussed in detail herein for the sake of concreteness, other embodiments are also specifically contemplated within the scope of this disclosure.

In one embodiment, a small-footprint operating system (referred to as a boot OS) may be installed on the edge gateway. The boot OS (or a software agent thereof) may be configured to support provisioning, monitoring, upgrading, and other management functionality. These tasks may be accomplished by connecting to a cloud management server in mode and using pull a "heartbeat" technique that periodically transmits information to the cloud management server to keep the connection persistent.

The information transmitted in each heartbeat may include status information regarding the edge gateway. The cloud management server may monitor this status information and respond with any suitable commands that should be carried out at the edge. The edge gateway may then execute such commands as they are received, carrying out any desired management functions.

Turning now to FIG. 2, an example architecture is shown for zero-touch management. As shown, edge gateway 202 is communicatively coupled (e.g., via the internet) to cloud management system 250. Additional edge devices (not shown in FIG. 2) may also be communicatively coupled to cloud management system 250 via edge gateway 202.

In general, edge gateway 202 may initiate communication with cloud management system 250 via an HTTP request, which may include status information regarding edge gateway 202 and/or any other edge devices. The status information may include currently installed software and/or firmware version information, CPU and/or memory and/or storage load information, thermal information, information regarding failures or alerts, and/or any other desired status information.

Cloud management system 250 may respond with an HTTP response. For example, if no further action is needed, cloud management system 250 may respond with an HTTP 204 response (no content). If further action is needed, cloud management system 250 may respond with an HTTP 200 response (ok), which may include specific instructions in the response body.

In a first embodiment, the architecture of FIG. 2 may be used for monitoring edge gateway 202 remotely. Edge gateway 202 may be powered on by a user, and it may obtain an IP address via manual configuration or dynamic host configuration protocol (DHCP). The IP address may be an internal address that is not publicly accessible. Edge gateway 202 may periodically transmit calls (e.g., HTTP REST calls) to cloud management system 250 as heartbeats with status information. In some embodiments, the heartbeats may be sent according to a default or configurable heartbeat frequency. Cloud management system 250 may receive the status information and perform any needed processing (e.g., storing, consolidating, displaying, etc.). If no action is needed, an HTTP response with return code 204 may be transmitted to edge gateway 202.

In a second embodiment, the architecture of FIG. 2 may be used for provisioning or upgrading edge gateway 202. If some action is needed on the edge gateway, then instead of responding with an HTTP 204 return code, cloud management system 250 may respond with an HTTP 200. In the response body, information (e.g., JSON information) may indicate the action that is included. Listing 1 below shows one example of a data format that may be used for this purpose.

```
[
    {"action": "provision",
        "data": {
            //A json format including the OS and/or
software information to provisioned
            ...
        },
    {"action": "Set heartbeat frequency",
        "data": { "frequency": 100} // set heartbeat
frequency to once every 100 seconds
        },
    {"action": "Execute shell command",
        "data": [
            "command1", "command2", ...
        ]
    }
]
```

Listing 1.

Accordingly, cloud management system 250 may perform any desired management tasks at edge gateway 202 (or any other edge systems communicatively coupled thereto) in spite of the fact that edge gateway 202 may not be publicly reachable.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of n apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that structure is "configured to" or "operable to" perform one or more tasks is expressly intended not to invoke 35 U.S.C. § 112 (f) for that claim element. Accordingly, none of the claims in this application as filed are intended to be interpreted as having means-plus-function elements. Should Applicant wish to invoke § 112 (f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   a memory;
   wherein the information handling system is configured to:
   receive a heartbeat message from a second information handling system via a network, wherein the second information handling system has an Internet Protocol (IP) address that is not publicly routed on the network such that the second information handling system is not publicly accessible via the network, and wherein the heartbeat message is operable to establish a communication channel between the information handling system and the second information handling system; and
   transmit a response to the second information handling system via the communication channel, wherein the response indicates whether any management tasks should be executed by the second information handling system.

2. The information handling system of claim 1, wherein the information handling system is a hyper-converged infrastructure (HCI) system.

3. The information handling system of claim 2, wherein the second information handling system is an edge gateway node of the HCI system physically located at an edge location.

4. The information handling system of claim 1, wherein the heartbeat message includes status information regarding the second information handling system.

5. The information handling system of claim 1, wherein the heartbeat message is a hypertext transfer protocol (HTTP) message.

6. The information handling system of claim 5, wherein the response is an HTTP message that includes instructions in a body thereof.

7. A method comprising:
   an information handling system receiving a heartbeat message from a second information handling system via a network, wherein the second information handling system has an Internet Protocol (IP) address that is not publicly routed on the network such that the second information handling system is not publicly accessible via the network, and wherein the heartbeat message establishes a communication channel between the information handling system and the second information handling system; and
   the information handling system transmitting a response to the second information handling system via the communication channel, wherein the response indicates whether any management tasks should be executed by the second information handling system.

8. The method of claim 7, wherein the information handling system is a hyper-converged infrastructure (HCI) system.

9. The method of claim 8, wherein the second information handling system is an edge gateway node of the HCI system physically located at an edge location.

10. The method of claim 7, wherein the heartbeat message includes status information regarding the second information handling system.

11. The method of claim 7, wherein the heartbeat message is a hypertext transfer protocol (HTTP) message.

12. The method of claim 11, wherein the response is an HTTP message that includes instructions in a body thereof.

13. An article of manufacture comprising a non-transitory, computer-readable medium having computer-executable instructions thereon that are executable by a processor of an information handling system for:

receiving a heartbeat message from a second information handling system via a network, wherein the second information handling system has an Internet Protocol (IP) address that is not publicly routed on the network such that the second information handling system is not publicly accessible via the network, and wherein the heartbeat message establishes a communication channel between the information handling system and the second information handling system; and transmitting a response to the second information handling system via the communication channel, wherein the response indicates whether any management tasks should be executed by the second information handling system.

14. The article of claim 13, wherein the information handling system is a hyper-converged infrastructure (HCI) system.

15. The article of claim 14, wherein the second information handling system is an edge gateway node of the HCI system physically located at an edge location.

16. The article of claim 13, wherein the heartbeat message includes status information regarding the second information handling system.

17. The article of claim 13, wherein the heartbeat message is a hypertext transfer protocol (HTTP) message.

18. The article of claim 17, wherein the response is an HTTP message that includes instructions in a body thereof.

* * * * *